United States Patent Office
3,084,422
Patented Apr. 9, 1963

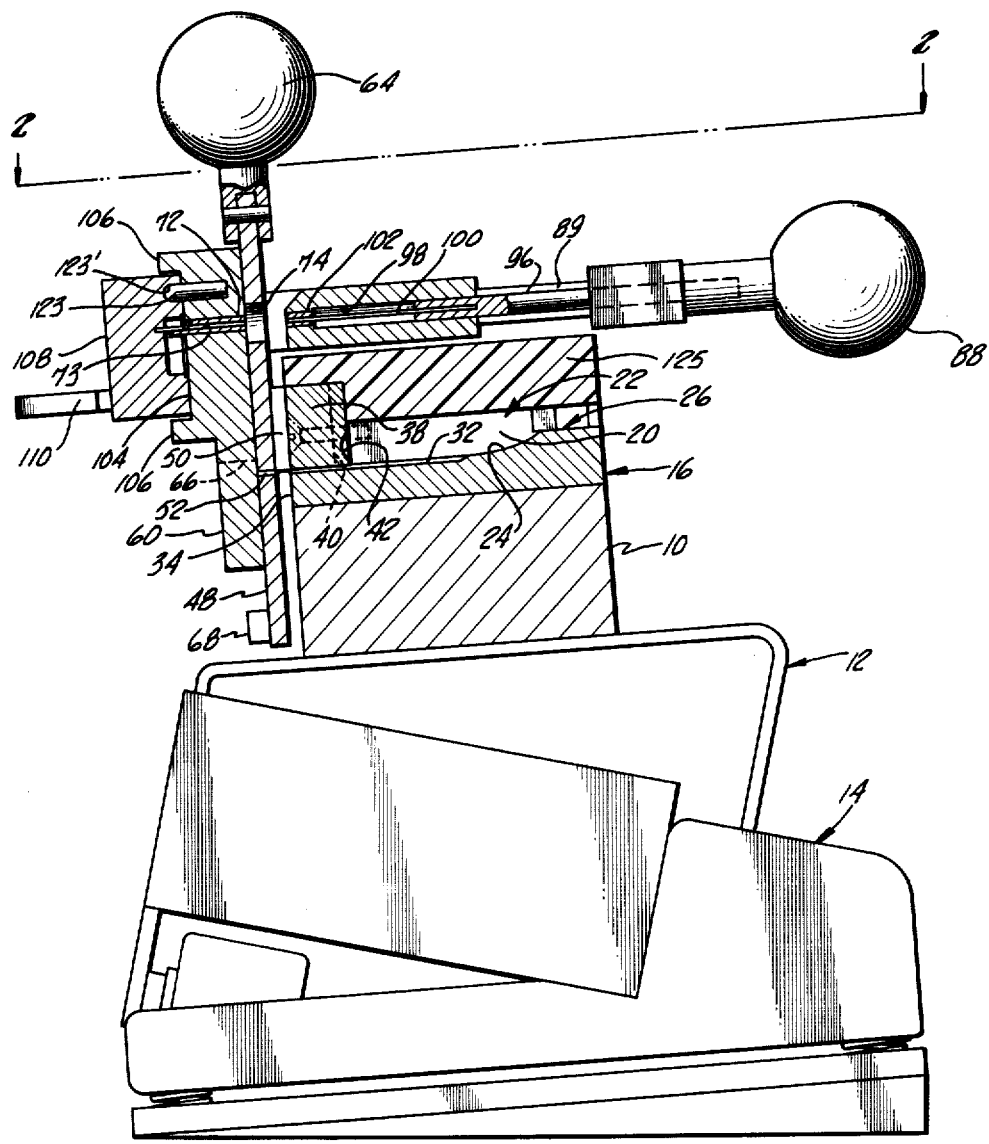
FIG_1
INVENTOR.
RICHARD R. BOWER

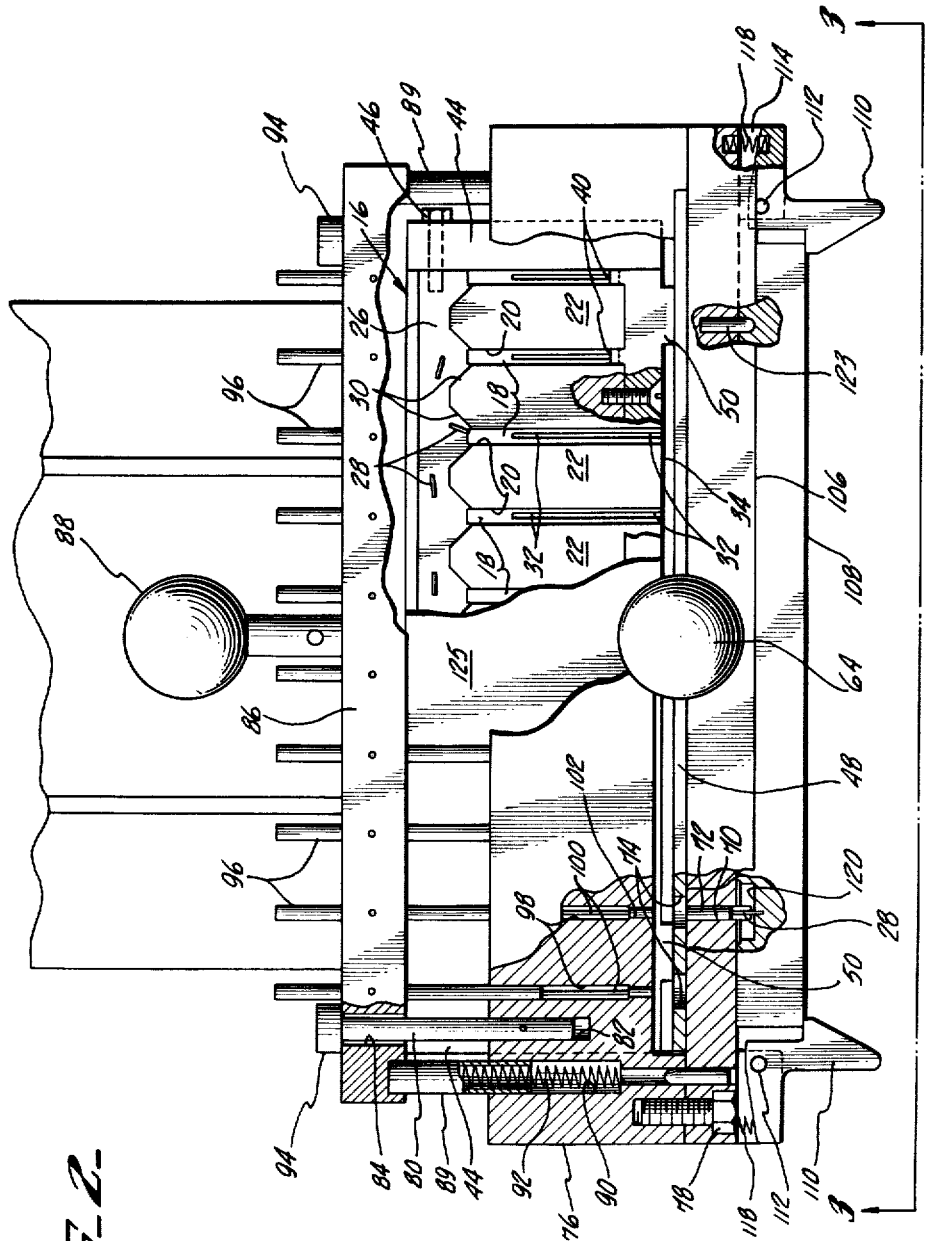

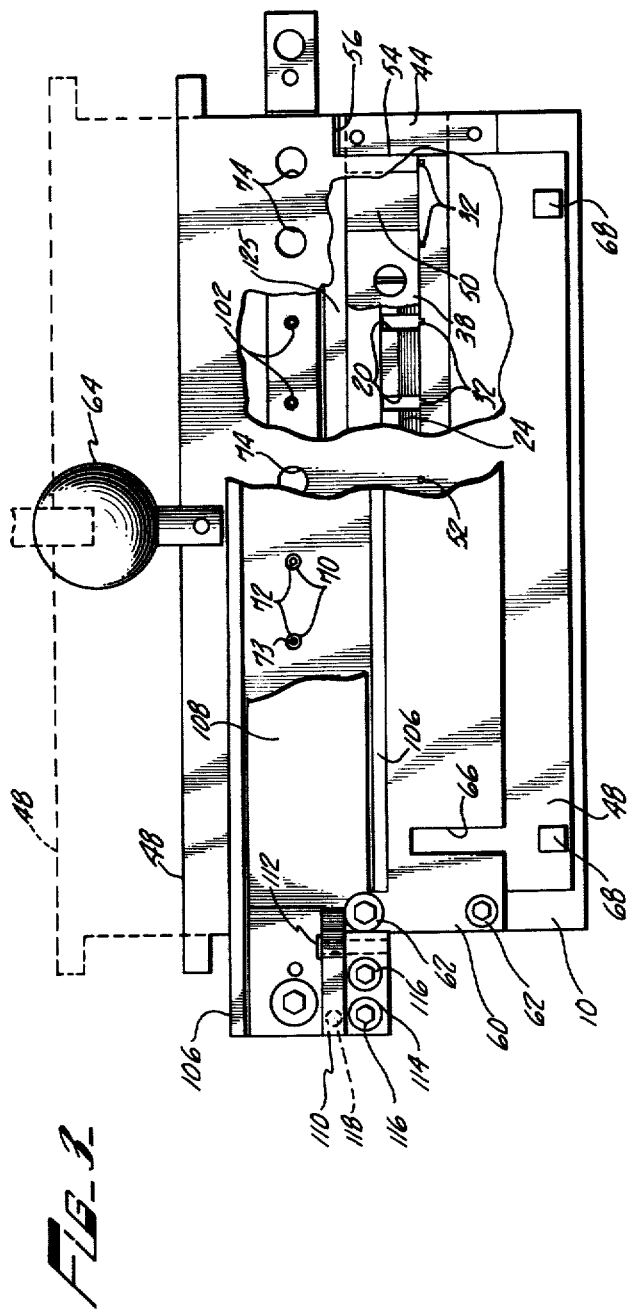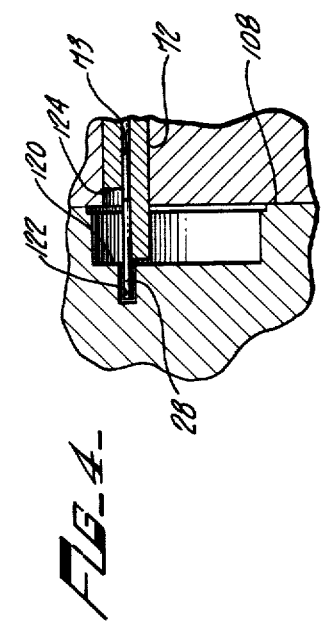

3,084,422
ARTICLE HANDLING
Richard R. Bower, Palo Alto, Calif., assignor, by mesne assignments, to Raytheon Company, Lexington, Mass., a corporation of Delaware
Filed July 17, 1961, Ser. No. 124,602
12 Claims. (Cl. 29—203)

This invention relates to the automatic selection and positioning of articles such as wires from a loose batch of the wires.

Although the invention is useful in many types of operations, it finds particular application in the automatic assembly of wire electrodes for transistors, and it is specifically described below with respect to that use.

One of the operations in the assembly of transistors requires the placement of relatively short and small diameter wires into relatively small diameter holes in a carbon boat. The short wires are ordinarily available in loose batches, and it is a tedious time consuming job to select the wires and insert them manually into the proper position.

This invention provides a machine which automatically selects individual wires from a loose batch of the wires and moves the selected wires to a loading station where they can be automatically moved into the proper position. In the preferred form, the apparatus selects a plurality of separate, individual wires simultaneously, and moves them to new respective positions for automatic and simultaneous loading into the desired location.

Briefly, this invention includes a hopper which has a bottom for holding a loose batch of wires. The hopper bottom has an elongated groove for receiving at least one wire to the exclusion of other wires in the hopper. A movable plate is disposed adjacent one end of the groove. Means are provided for moving the plate transversely with respect to the groove between a first and a second position. The plate has an elongated opening in it collinear with and opening toward the groove when the plate is in the first position. Means are provided for moving the wire in the groove into the plate opening when the plate is in the first position. Means are also provided for moving the wire out of the opening in the plate when the plate is in the second position.

The preferred form of the invention includes a vibrator for moving an individual wire into the hopper groove and for advancing the wire into the plate opening when the plate is in the first position. Preferably, the plate opening extends entirely through the plate, and a fixed plate is disposed adjacent the side of the movable plate opposite from the hopper groove to prevent the wire from passing all the way through the opening when the movable plate is in the first position.

The fixed plate includes an opening disposed to be collinear with the movable plate opening when the movable plate is in the second position. A pusher pin is disposed to be collinear with the openings in the fixed and movable plates when the movable plate is in the second position for pushing a wire out of the opening in the movable plate and into a bore in a carbon boat releasably held on the face of the fixed plate opposite from the face adjacent the movable plate.

Preferably, the apparatus includes deflector means at the discharge end of the hopper groove for receiving and turning back wires which are vibrated toward the movable plate and are out of the hopper groove.

These and other aspects of the invention will be more fully understood from the following detailed description and the accompanying drawings in which:

FIG. 1 is a sectional view of the presently preferred embodiment of the invention;

FIG. 2 is a plan view, partly broken away, taken on line 2—2 of FIG. 1;

FIG. 3 is a view taken on line 3—3 of FIG. 2; and

FIG. 4 is an enlarged view showing a wire being pushed into a small bore in a carbon boat.

Referring to the drawings, a base 10 is rigidly secured to the top of a bracket 12 of a conventional linear type vibrator 14 sold under the tradename of "Syntron" by the Syntron Company, of Homer City, Pennsylvania. A hopper block 16 is rigidly secured to the top of the base 10. A plurality of relatively narrow and deep hoppers 18 are formed in the top of the hopper block so that each hopper, except for the end hoppers, has opposite sides 20 formed by parallel fingers 22 on the top surface of the hopper block. As shown best in FIG. 1, the rear (right) end of each hopper bottom curves gently upwardly at 24 to join a transverse feeder trough 26 formed across the back edge of the hopper block. Loose wires 28 are dumped into the feeder trough and vibrated into each of the hoppers. As shown best in FIG. 2, the rear end of each finger is tapered at 30 to provide an enlarged opening for each hopper. A separate respective hopper groove 32 is formed in the bottom of each hopper and extends from the forward end of the curved portion of the hopper bottom to the forward edge 34 of the hopper block.

The forward ends of the fingers 22 stop short of the forward edge of the hopper block to leave a shelf 36 across which is mounted an elongated deflector bar 38 that includes a plurality of extensions 40, each of which extends into the forward end of a separate respective hopper. The bottom of the deflector bar forms a roof for the forward end of each hopper groove 32. The inside bottom edge of each extension 40 includes a concave recess 42 to receive and turn back excess wires which are vibrated toward the discharge (left) end of the hopper groove, and which are not in the groove.

Hopper end walls 44 are secured by bolts 46 to opposite ends of the hopper block to form the outside wall of each of the end hoppers. A movable elevator plate 48 is disposed adjacent the outlet ends of the hopper grooves, and is disposed with one surface against a pair of outwardly extending wear projections 50 formed integrally on the deflector bar. The elevator plate is movable vertically between a first (solid line) position and a second (dotted line) position as shown in FIG. 3. The elevator plate includes a plurality of horizontally spaced and elongated wire receiving openings 52 which extend entirely through the place and are each collinear with the forward end of a respective hopper groove when the plate is in the first position. As shown best in FIG. 3, each end of the elevator plate is recessed at 54 to each a horizontal shoulder 56 which rests on the upper edge of each hopper side 44 that extends slightly forward of the hopper block.

A fixed plate 60 is rigidly secured by bolts 62 to the forward ends of each of the hopper side plates 44. The fixed plate makes a close sliding fit against the outside surface of the elevator plate, which is movable between the solid and dotted line positions by a handle 64 secured to its upper edge. The fixed plate includes a pair of vertical slots 66 opening downwardly out of its lower edge to receive separate outwardly extending stops 68 on the elevator plate.

The fixed plate also includes a plurality of horizontally spaced holes 70 opening through it adjacent its upper edge. A separate guide bushing 72 is disposed in each bore 70 to be flush with the inside surface of the fixed plate and project slightly beyond the outside surface of the plate. Each bushing is collinear with a respective opening 52 in the elevator plate when the elevator plate is raised to the dotted line position shown in FIG. 3. As shown best in FIG. 1, the elevator plate includes a plurality of inspection holes 74 opening through it to be each collinear with the inner end of a respective bushing 72 when the plate is down in the solid line position. The inspection holes make it easy to inspect the condition of a guide bore 73 in each bushing 72 during the operation of the apparatus.

A horizontal U-shaped frame 76 is rigidly secured by bolts 78 to the rear face and upper edge of the fixed plate. A pair of rearwardly extending horizontal guide pins 80 are rigidly secured at their forward ends in respective bores 82 opening out of the rear of the frame. Each guide pin makes a slip fit through a respective bore 84 in a horizontal stripper bar 86 disposed parallel to the frame and adapted to be slid toward and away from the frame on the guide pins by a handle 88 rigidly attached to the rear edge of the stripper bar.

A separate tubing 89 is rigidly attached to each end of the stripper bar and extends horizontally and forwardly into a respective bore 90 at each end of the frame. A separate compression spring 92 is coaxially disposed within each tubing 89 to urge the stripper bar away from the frame and against stops 94 secured to the rear ends of the guide pins.

A plurality of horizontal pusher rods 96 are mounted in the stripper bar to extend forward into respective stepped bores 98 extending through the central portion of the U-shaped frame. A separate relatively small diameter pusher pin 100 is press-fitted in the forward end of each pusher rod and extends through a reduced portion 102 of its respective stepped bore to terminate flush with the forward edge of the central portion of the U-shaped frame when the stripper bar is pushed rearwardly against the stops 94 as shown in FIG. 2. As shown best in FIG. 1, each pusher pin 100 is collinear with the guide bore 73 in a respective bushing 72 of the fixed plate.

As shown best in FIG. 1, a forwardly opening groove 104 is formed in the forward surface of the fixed plate 60 between a pair of horizontal flanges 106 formed integrally with the plate. An elongated, rectangular carbon boat 108 makes a close fit in the groove and is held in place by a pair of pawls 110 mounted on vertical pivot pins 112 at opposite ends of the face plate. Each pivot pin 112 extends down through a respective pawl and into a pivot block 114 secured by screws 116 to the forward surface of the fixed plate. A separate compression spring 118 (FIG. 2) urges each pawl to pivot in a direction to hold carbon boat against the face plate.

As shown best in FIG. 2, the carbon boat has a plurality of relatively large bores 120 which each fit over the forward end of a respective bushing 72. As shown best in FIG. 4, the forward end of each bushing extends slightly beyond the forward surface of the face plate and makes a close fit against the bottom of a respective bore 120 in the carbon boat 108. The guide bore 73 in each respective bushing 72 is collinear with a respective small bore 122 in the bottom of a large bore 120 of the carbon boat. The top half of a forward end portion of each bushing 72 is cut away to form a notch 124 to facilitate the removal of the carbon boat after the wire 28 is pushed into the bore 122.

A pair of indexing pins 123 are press-fitted into the groove 104, and each fits into a respective indexing bore 124 in the carbon boat to insure perfect alignment of the bushing opening 73 with respective bores 122 in the carbon boat. A plastic cover 125 is disposed over the forward portion of the hopper block to prevent dirt and the like from settling into the hoppers.

In the operation of the apparatus, a carbon boat is placed in the position shown in FIGS. 1 and 2 and held in place by the pawls. A batch of short wires 28 is dumped into the hopper's feeder opening 26, and the vibrator is turned on so that the wires are vibrated into each of the hoppers 18 and into the groove 20 in the bottom of the hoppers. The elevator plate is in the down (solid line) position so that a short wire is vibrated forward in each groove 20, under the deflector bar 38, and into a respective bore 52 in the elevator plate. The forward end of the wire comes to rest against the fixed plate and the wire is of such a length that its rear end is forward of the forward edge of the deflector bar. The wires on top of the wires in the groove 20 vibrate forward and engage the curved portion 42 of the deflector bar and are turned back into the hopper. This feature prevents jamming of the wires against the outlet end of the groove.

The elevator plate is lifted by the handle 64 until the stops 68 engage the upper end of notches 66 in the fixed plate. Each wire in each bore 52 of the elevator plate is now collinear with a respective guide bore in a bushing 72 and with a pusher pin 100. The stripper bar is pushed forward (to the left as viewed in FIGS. 1 and 2) by the handle 88, causing the forward end of each pusher pin to engage the rear end of a respective wire in a bore 52 and push the wire through the guide bore 73 and into a small bore 122 of the carbon boat as shown in FIG. 4. The stripper bar handle is released and the springs 92 return the stripper bar to the position shown in FIGS. 1 and 2. The elevator plate is lowered back to the solid line position so that another set of wires enter the openings 52 in the plate. The carbon boat is removed by pulling it outwardly and tilting it slightly counterclockwise (as viewed in FIG. 1) so that the pawls 110 are forced open against the action of their respective springs 118. One feature of the pawls is that they may be forced open in the event that a wire misses the small bore 122 in the carbon boat or if the bore should be already filled or imperfectly drilled, so that no damage is done to the boat or the apparatus due to forcing of the stripper bar to the wire-loading position.

Another set of wires is quickly and easily loaded by putting another carbon boat in position on the fixed plate and repeating the above described operation.

I claim:

1. Apparatus for selecting and positioning wires, the apparatus comprising a hopper having a bottom for holding a loose batch of the wires, the hopper bottom having an elongated groove for receiving one wire to the exclusion of the other wires, a movable plate disposed adjacent one end of the groove, means for moving the plate transversely with respect to the groove between a first and a second position, the plate having an elongated opening in it collinear with and opening toward the said end of the groove when the plate is in the first position, means for moving the wire in the groove into the plate opening when the plate is in the first position, and means for moving the wire out of the opening in the plate when the plate is in the second position.

2. Apparatus for selecting and positioning wires, the apparatus comprising a hopper having a bottom for holding a loose batch of the wires, the hopper bottom having an elongated groove for receiving one wire to the exclusion of the other wires, a movable plate disposed adjacent one end of the groove, means for moving the plate transversely with respect to the groove between a first and a second position, the plate having an elongated opening in it collinear with and opening toward the said end of the groove when the plate is in the first position, a vibrator attached to the hopper for vibrating and moving the wire in the groove into the plate opening when the plate is in the first position, and means for moving the wire out of the opening in the plate when the plate is in the second position.

3. Apparatus for selecting and positioning wires, the apparatus comprising a hopper having a bottom for holding a loose batch of the wires, the hopper bottom having an elongated groove for receiving one wire to the exclusion of the other wires, a movable plate disposed adjacent one end of the groove, means for moving the plate transversely with respect to the groove between a first and a second position, the plate having an elongated opening through it collinear with and opening toward the said end of the groove when the plate is in the first position, means for moving the wire in the groove into the plate opening when the plate is in the first position, stop means for limiting the movement of the wire into the plate opening, and means for moving the wire out of the opening in the plate when the plate is in the second position.

4. Apparatus for selecting and positioning wires, the apparatus comprising a hopper having a bottom for holding a loose batch of the wires, the hopper bottom having an elongated groove for receiving one wire to the exclusion of the other wires, a movable plate disposed with one side adjacent one end of the groove, means for moving the plate transversely with respect to the groove between a first and a second position, the plate having an elongated opening in it collinear with and with one end opening toward the said end of the groove when the plate is in the first position, means for moving the wire in the groove into the plate opening when the plate is in the first position, a fixed plate disposed adjacent the other end of the opening in the movable plate to limit the travel of the wire into the movable plate opening, and means for moving the wire out of the opening in the plate when the plate is in the second position.

5. Apparatus for selecting and positioning wires, the apparatus comprising a hopper having a bottom for holding a loose batch of the wires, the hopper bottom having an elongated groove for receiving one wire to the exclusion of the other wires, a movable plate disposed adjacent one end of the groove, means for moving the plate transversely with respect to the groove between a first and a second position, the plate having an elongated opening in it collinear with and opening toward the said end of the groove when the plate is in the first position, means for moving the wire in the groove into the plate opening when the plate is in the first position, a pusher pin disposed collinear with the movable plate opening when the plate is in the second position, and means for moving the pusher pin into the plate opening to push the wire out of the opening when the plate is in the second position.

6. Apparatus for selecting and positioning wires, the apparatus comprising a hopper having a bottom for holding a loose batch of the wires, the hopper bottom having an elongated groove for receiving one wire to the exclusion of the other wires, a movable plate disposed with one side adjacent one end of the groove, means for moving the plate transversely with respect to the groove between a first and a second position, the plate having an elongated opening in it collinear with and with one end opening toward the said end of the groove when the plate is in the first position, means for moving the wire in the groove into the movable plate opening when the movable plate is in the first position, a fixed plate disposed adjacent the other end of the opening in the movable plate to limit the travel of the wire into the movable plate opening, the fixed plate having an opening disposed to be collinear with the opening in the movable plate when the movable plate is in the second position, a movable pusher pin disposed collinear with the fixed plate opening, and means for moving the pusher pin into the movable plate opening to push the wire into the fixed plate opening when the plate is in the second position.

7. Apparatus for selecting and positioning a wire in an opening in a receptacle, the apparatus comprising a hopper having a bottom for holding a loose batch of the wires, the hopper bottom having an elongated groove for receiving one wire to the exclusion of the other wires, a movable plate disposed adjacent one end of the groove, means for moving the plate transversely with respect to the groove between a first and a second position, the plate having an elongated opening in it collinear with and opening toward the said end of the groove when the plate is in the first position, means for moving the wire in the groove into the plate opening when the plate is in the first position, means for holding the receptacle with the opening in it aligned with the opening in the movable plate when the plate is in the second position, and means for moving the wire out of the opening in the plate and into the receptacle opening when the plate is in the second position.

8. Apparatus according to claim 7 which includes means for releasably holding the receptacle with its opening aligned with the opening in the movable plate when the plate is in the second position.

9. Apparatus for selecting and positioning wires, the apparatus comprising a hopper having a bottom for holding a loose batch of the wires, the hopper bottom having an elongated groove for receiving one wire to the exclusion of the other wires, a movable plate disposed adjacent one end of the groove, means for moving the plate transversely with respect to the groove between a first and a second position, the plate having an elongated opening in it collinear with and opening toward the said end of the groove when the plate is in the first position, means for moving the wire in the groove into the plate opening when the plate is in the first position, deflector means disposed in the hopper over the groove to receive and reverse the direction of wires in the hopper and disposed above the hopper groove, and means for moving the wire out of the opening in the plate when the plate is in the second position.

10. Apparatus for selecting and positioning wires, the apparatus comprising a hopper having a bottom for holding a loose batch of the wires, the hopper bottom having an elongated groove for receiving one wire to the exclusion of the other wires, a movable plate disposed adjacent one end of the groove, means for moving the plate transversely with respect to the groove between a first and a second position, the plate having an elongated opening in it collinear with and opening toward the said end of the groove when the plate is in the first position, means for moving the wire in the groove into the plate opening when the plate is in the first position, a guide bushing mounted adjacent the movable plate, the bushing having a guide bore through it disposed to be collinear with the plate opening when the plate is in the second position, and means for moving the wire out of the opening in the plate and into the guide bushing bore when the plate is in the second position.

11. Apparatus according to claim 10 in which one end of the bushing is notched to the bore to facilitate removal of the wire from it.

12. Apparatus for selecting and positioning elongated wires, the apparatus comprising a hopper having a bottom for holding a loose batch of the wires, the hopper bottom having an elongated groove for receiving one wire to the exclusion of the other wires, a movable plate disposed adjacent one end of the groove, the plate having an opening which is collinear with and opens toward one end of the groove when the plate is in a first position, means for moving the wire in the groove into the opening in the plate when the plate is in the first position, means for moving the plate in a direction transverse to the longitudinal axis of the wire to move the wire from the first to a second position, and means for transferring the wire longitudinally from the second to a third position.

References Cited in the file of this patent
UNITED STATES PATENTS
2,334,004    Herzog _____ Nov. 9, 1943

UNITED STATES PATENT OFFICE
CERTIFICATE OF CORRECTION

Patent No. 3,084,422                                                  April 9, 1963

Richard R. Bower

It is hereby certified that error appears in the above numbered patent requiring correction and that the said Letters Patent should read as corrected below.

Column 2, line 49, for "place" read -- plate --; line 52, for "each", second occurrence, read -- form --.

Signed and sealed this 12th day of November 1963.

(SEAL)
Attest:
ERNEST W. SWIDER                                    EDWIN L. REYNOLDS Attesting Officer                                       Acting   Commissioner of Patents